United States Patent [19]

Johnson et al.

[11] Patent Number: 5,761,420
[45] Date of Patent: Jun. 2, 1998

[54] METHOD AND APPARATUS FOR TELEPHONE PROOF OF DOCUMENTS

[76] Inventors: William Johnson, 1445 Sedalra Dr., Flower Mound, Tex. 75028; Owen Weber, 210 Tara Ct., Coppell, Tex. 75019

[21] Appl. No.: 396,296
[22] Filed: Feb. 28, 1995
[51] Int. Cl.⁶ .......................... G06F 17/21; G06F 17/20
[52] U.S. Cl. ............... 395/200.35; 395/200.76; 395/331; 395/887; 379/93.09
[58] Field of Search ...................... 395/733, 887, 395/200.34, 200.66, 200.76, 200.57, 200.35; 379/93.01, 93.09

[56] References Cited

U.S. PATENT DOCUMENTS

| | | | |
|---|---|---|---|
| 4,410,957 | 10/1983 | Cason et al. | 345/172 |
| 5,157,384 | 10/1992 | Greanias et al. | 340/706 |
| 5,241,625 | 8/1993 | Epard et al. | 345/502 |
| 5,280,583 | 1/1994 | Nakayama et al. | 395/200.35 |
| 5,363,507 | 11/1994 | Nakayama et al. | 345/330 |
| 5,392,400 | 2/1995 | Berkowitz et al. | 395/200.33 |
| 5,423,043 | 6/1995 | Fitzpatrick et al. | 395/683 |
| 5,513,323 | 4/1996 | Williams et al. | 395/200.76 |

*Primary Examiner*—Jack B. Harvey
*Assistant Examiner*—Jeffrey K. Seto
*Attorney, Agent, or Firm*—Gunn & Associates, P.C.

[57] ABSTRACT

A method and apparatus that enables modification of a document via telephone. One user is defined as a Driver and another user is defined as a Passenger. The Driver then determines the changes to be made to the document, and the changes are reflected in both versions of the document. Further, it is not necessary that both Driver and Passenger use the same application program.

36 Claims, 8 Drawing Sheets

EDITOR A NAVIGATION:
PAGE DOWN = PGDWN
PAGE UP = PGUP
NEXT PARA = CTRL-F3
PREVIOUS PARA = CTRL-ALT-F3
NEXT SENTENCE = CTRL-F4
PREVIOUS SENTENCE = CTRL-ALT-F4
NEXT WORD = CTRL-F5
PREVIOUS WORD = CTRL-ALT-F5
TOP OF DOCUMENT = ALT-PGUP
BOTTOM OF DOC = ALT-PGDWN
START SEARCH = F2
END SEARCH = F2
... CHARACTERS ...

EDITOR B NAVIGATION:
PAGE DOWN = PGDWN
PAGE UP = PGUP
NEXT PARA = <ALT-P><1><CR>
PREVIOUS PARA = <ALT-P><1><CR>
NEXT SENTENCE = ALT-S
PREVIOUS SENTENCE = ALT-S
NEXT WORD = ALT-W
PREVIOUS WORD = CTRL-W
TOP OF DOCUMENT = CTRL-HOME
BOTTOM OF DOC = CTRL-END
START SEARCH = CTRL-F2
END SEARCH = ENTER
... CHARACTERS ...

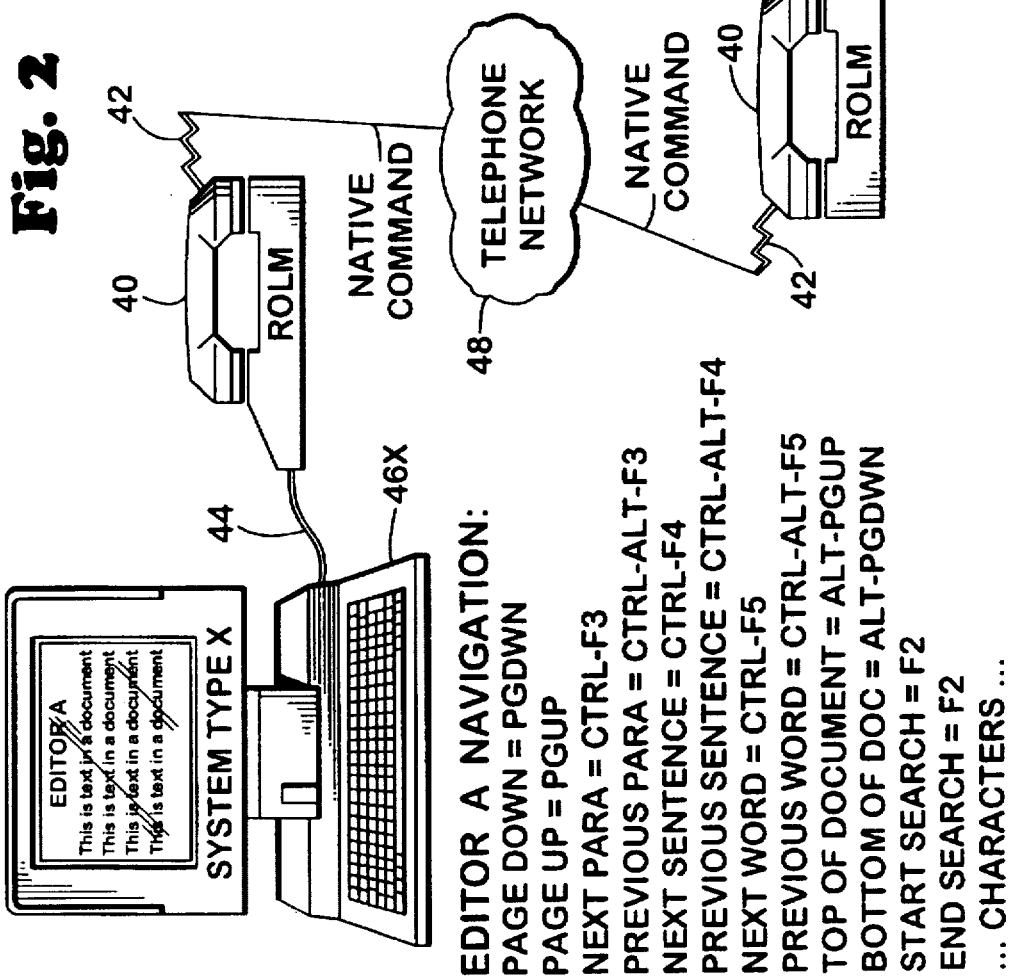

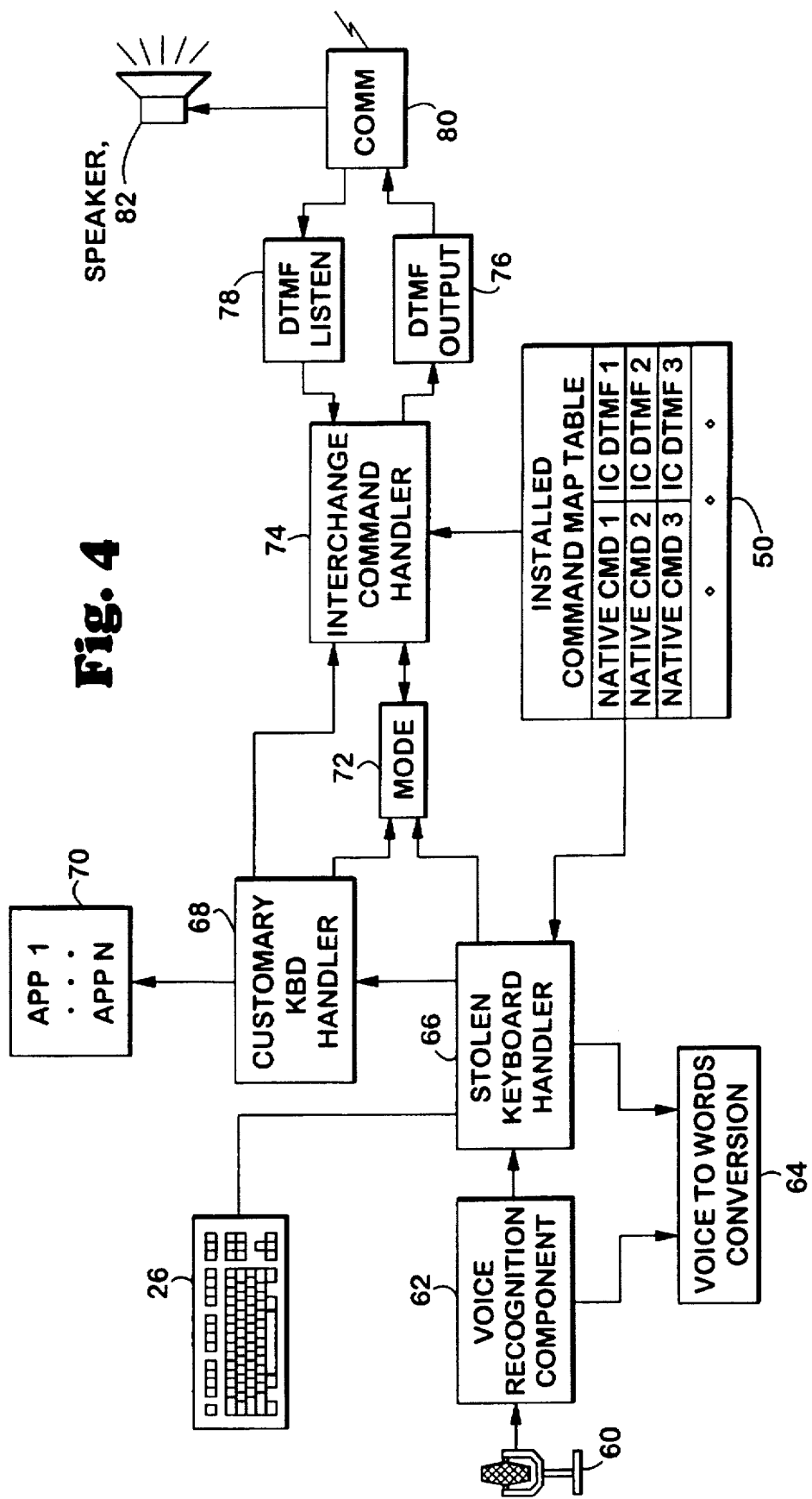

METHOD AND APPARATUS FOR TELEPHONE PROOF OF DOCUMENTS

FIELD OF THE INVENTION

The present invention relates generally to the field of methods and devices for editing documents and, more particularly, to a method and apparatus to facilitate the editing of documents by telephone.

BACKGROUND OF THE INVENTION

Documents frequently require comments or editorial changes by several people. For example, a team of inventors may work together on an idea they have formulated, each crafts his understanding of the joint invention, and then they submit an invention disclosure which requires their cooperative effort.

In this scenario, one inventor writes a particular disclosure. All inventors review the disclosure and provide each other with comments. If the inventors are located in distant facilities and minor syntactical errors need correction, it may be undesirable to fax many pages, each with minor changes. One inventor may choose to call the other inventor and make fixes by telephone. The inventor performing the function of editing the disclosure pulls a soft copy up within an editor application in order to make changes. The other inventors provide comments by speaking changes to the co-inventor over the phone.

In this scenario, it is difficult to explain locations for changes to the editor. Paragraphs, line numbers, text strings, etc. are spoken in order to help identify the targets for change. After locating a target, the change is communicated to the one editing the disclosure and changes are then made.

There are numerous other examples of editing documents, where more than one party wishes to make changes. For example, legal documents, such as briefs, frequently require the input of several lawyers, for example lead counsel and co-counsel or local counsel. Further, committees tasked with producing a document often will delegate such a responsibility to a number of committee members. Also, more than one person may have responsibility for approving the final product of a spread sheet, a graphical document, or other applications.

The process of modifying such documents by phone causes much frustration for both parties on the telephone call because of the difficulty in unambiguously identifying locations in the document for changes. A method is therefore needed for providing a more efficient communication from one person to another or to several others to edit a document.

SUMMARY OF THE INVENTION

One embodiment of the present invention assumes two sessions, called a double-session, between connected users: one for voice communications and one for command communications. Another embodiment can use one session, which utilizes Dual-Tone Multiple Frequency (DTMF) signals intermixed with voice communications over the same session. The detailed description below should be read and understood with each of these embodiments in mind.

The present invention further provides a telephone call monitoring mechanism coupled to an editor application for allowing a remote caller to automatically govern locating a cursor within an editor application document being edited. Once a telephone call is established, the editing party invokes a particular document for editing within the editing application and invokes the present invention service from within the document management application. The telephone line is placed into speaker phone mode and the service listens, along with the user, for commands or audibles from the connected party.

The commenting or editing party may use well known DTMF sequences to delimit search criteria. In a preferred embodiment, the commenting party speaks a unique phrase. The service searches the current document for the spoken phrase, for example. Automatic scrolling is performed to find a phrase. When found, the parties can talk about changes to make. Little time was wasted searching for and finding the phrase. Further provided are directive DTMF sequences for directing by absolute logical entity within a document (e.g., page 3, line 4) or relative logical entity within a document (e.g., paragraph down). Well known phrases such as "paragraph 9, line 4" are understood and the cursor is appropriately positioned automatically.

An alternative embodiment supports a commenting party to actually perform changes. Upon validation from the editing party that the cursor is placed correctly, the commenting party may then substitute, insert, delete, etc. a phrase of words associated with the current cursor position.

The present invention facilitates telephone collaboration of document changes and integrates editor functions with that process. The present invention is equally applicable to multi-party conference calls in which three or more parties may wish to provide such editorial changes to a document.

This technique of providing document changes remotely may be referred to herein as the coordinated maintenance of data, since a single party acts as the Driver and one or more other parties, who receive the Driver's changes to the document, act as Passengers, in a coordinated fashion.

In the broadest sense, the method of the present invention, in conducting this coordinated maintenance of data comprises the steps of (1) establishing communications between at least two data processing systems, (2) executing a keyboard interrupt program, (3) executing an interchange command handler program, (4) setting a mode, such as a Driver mode or a Passenger mode, and coordinating commands between the data processing systems according to the selected mode. In addition, the Driver mode may comprise search for a specified string of characters, called a string search, or the Driver mode may comprise a string edit, in which one or more characters of the target document may be edited.

These and other objects and features of the present invention will be immediately apparent to those of skill in the art.

BRIEF DESCRIPTION OF THE DRAWINGS

For a more complete understanding of the present invention and the features and advantages thereof, reference is now made to the Detailed Description in conjunction with the attached Drawings, in which:

FIG. 2 is a schematic diagram of a pair of data processing systems, coupled through a telephone network.

FIG. 4 is a block diagram of the structure of the apparatus of the present invention for a single-line, single-session embodiment.

DETAILED DESCRIPTION OF A PREFERRED EMBODIMENT

Figures 1, 3:
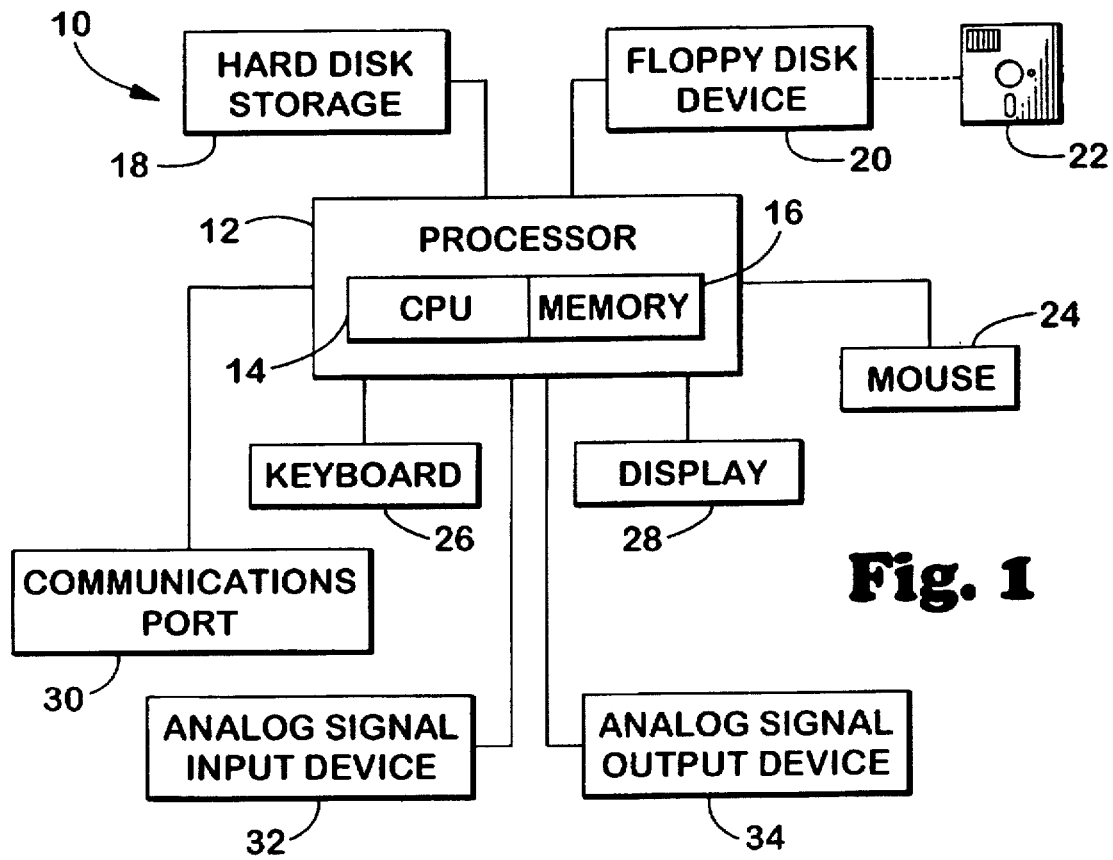
FIG. 1 is a block diagram of a general data processing system wherein the present invention may advantageously find application.
FIG. 3 depicts a data structure of a command map table used in carrying out the preferred embodiment of the present invention.

FIG. 1 depicts a block diagram of a data processing system 10 wherein the present invention finds useful application. As used herein, the term "data processing system" is used in its broadest sense to include computing and processing means, including peripheral devices, that may be used for calculating, word processing, spread sheet applications, and the like.

The data processing system 10 includes a processor 12, which includes a central processing unit (CPU) 14 and a memory 16. Additional memory, in the form of a hard disk file storage 18 and a floppy disk device 20, is connected to the processor 12. Floppy disk device 20 receives a diskette 22 which has computer program code recorded thereon that implements the present invention in the data processing system 10. The data processing system 10 may include user interface hardware, including a mouse 24 and a keyboard 26 to allow a user access to the processor 12 and a display 28 for presenting visual data to the user. The data processing system 10 may also include a communications port 30 for communicating with a network or other data processing systems. The data processing system 10 may also include analog signal devices, including an analog signal input device 32 for entering analog signals into the data processing system 10, and an analog signal output device 34 for reproducing analog signals.

In one embodiment, a single-line, single-session speaker phone connection is supported by the present invention through sending and receiving DTMF signals intermixed during the analog voice phone call.

As shown in FIG. 2, the present invention is also particularly adapted to a single-line, double-session phone environment, shown in FIG. 2 as a pair of ROLM phones 40, preferably ROLM 244PC.

The general feature of interest of the phones 40 is a single line 42 that connects to a phone jack (not shown) and a serial input 44 into a processing system, shown in FIG. 2 as a workstation 46X or 46Y. This feature permits a voice session and a data session over the same phone line. The single-line phones 40 communicate through a telephone network 48. Other embodiments of the present invention require two lines (i.e., another type of double-session, one for data and one for voice).

FIG. 2 depicts another feature of the present invention. The present invention functions equally well if the workstations 46X and 46Y have the same or different editors. While the navigation commands depicted in FIG. 2 are those of a word processing editor, those of skill in the art will appreciate that the present invention also applies to other editors, such as spreadsheet programs and the like.

In the present invention, one of the stations serves as the control. The control station may be referred to as the "user", the "sender", or the "Driver". The other station(s) may be referred to as the "connected user(s)", the "recipient(s)", or the "Passenger(s)".

Each data processing system, System Type X and System Type Y, maintains its own set of command map tables 50, shown in FIG. 3, to accommodate different editors with which the system may communicate. The command map table is preferably maintained in the memory 16 of the processor 12 (FIG. 1). The command map table 50 includes two sets of fields, a set of native commands 52 and a set of command sequences 54, dependent on a particular application. The set of eligible native commands 52 comprises logical navigation entities, such as page up, page down, next paragraph, etc., as defined by the editor on that system (thus, native). The set of native commands also includes specific character key strokes or function keys. It is very important to recognize that the command map table 50 may be constructed with intent for the absence of commands or characters as well as the presence of commands or characters to ensure desirable operation with respect to the present invention.

In a preferred embodiment, the system includes a plurality of command map tables 50, one each for the well known editors, such as MICROSOFT WORD, WordPerfect, LOTUS 1-2-3, etc. The set of command sequences 54 comprises the actual sequences of keystrokes to carry out the native commands, such as Ctrl-Alt-F5 for "previous word" in Editor A, or even multiple keystrokes. The set of native commands 52 and the set of command sequences 54 will also include letters (upper and lower case), numbers, and other characters to permit editing and string searching in a remote document, in accordance with this invention.

The command map table 50 includes native commands and command sequences, but it preferably deals on a keyboard basis. A voice command interface applies to this invention with respect to the fact that many voice control systems have a template with a trained voice field, or an average of many voices to eliminate the need for training, which maps to keystrokes. When a command is recognized by the voice control system, it automatically issues the particular keystrokes to the keyboard of the system for processing. The underlying data processing system sees keystrokes without knowing whether they originated from a voice command or the keyboard itself.

This feature may be more readily visualized with reference to FIG. 4. The system of FIG. 4 includes a keyboard 26 which may provide keystrokes to a stolen keyboard handler 66. The stolen keyboard handler simply intercepts keystrokes and determines proper routing therefrom. Operating systems commonly include Terminate and Stay Resident Programs, as well as vector interrupts in low address memory to carry out hardware interrupts. Each vector interrupt may have, for example, a four byte address, including a segment and an offset. This comprises a terminate and stay resident vector table (i.e., a large jump table), a code that is loaded into the system's memory, so that when a key on the keyboard is depressed (or a signal is developed by any other peripheral equipment), the character code so generated is automatically pushed onto a system stack. That address is then called in the vector table as a function call. The keyboard character code is passed as a parameter to that function, the function executes, and is returned. The terminate and stay resident device drivers are called through the jump table. The stolen keyboard handler 66 permits viewing any of the keyboard (or other peripheral) inputs before a customary keyboard handler 68.

The system further includes a voice recognition component 62, which may receive a voice signal from, for example, a microphone 60. The voice recognition component 62, recognizing the voice signal from the microphone, issues keystrokes to the stolen keyboard handler 66, in a manner that is transparent to the system. A voice-to-words conversion element 64 receives a digitized voice signal from the voice recognition component 62 and converts this signal to words (including commands).

The system also includes a customary keyboard handler 68. The customary keyboard handler 68 receives routed keystrokes from the stolen keyboard handler 66, as previously described, and routes these keystrokes to one of the applications in an applications arena 70, or to a modifiable local variable MODE 72, discussed below in greater detail. The MODE 72 is communicated to an interchange command handler 74, which is also capable of modifying the MODE 72. The interchange command handler 74 is responsible for processing all requests during a data/voice session, as described below with regard to the logic flow diagrams.

The interchange command handler 74 receives dual-tone, multiple frequency (DTMF) signals from a DTMF listen unit 78 and issues commands to a DTMF output unit 76. Each of the units 76 and 78 is coupled to a communications box 80, which enables communication with a remote unit via phone lines, as well as an analog signal that may be broadcast by a speaker 82. The structure just described permits the simultaneous communication of a voice signal and a DTMF signal, like that generated by a touch-tone phone, during a single session.

FIG. 4 demonstrates a single-line, single-session connection between parties using the present invention. DTMF signals are intermixed with voice during the phonecall. Another embodiment (not shown) requires two sessions between parties, one for voice communications and one for command transmission and reception. This embodiment of the stolen keyboard handler 66 will send data to the connected party over the data line session. This embodiment of the interchange command handler 74 will receive data from the connected party on the data line session. Voice interaction, as is customary on a telephone call, will occur on the analog line session.

Figure 5:
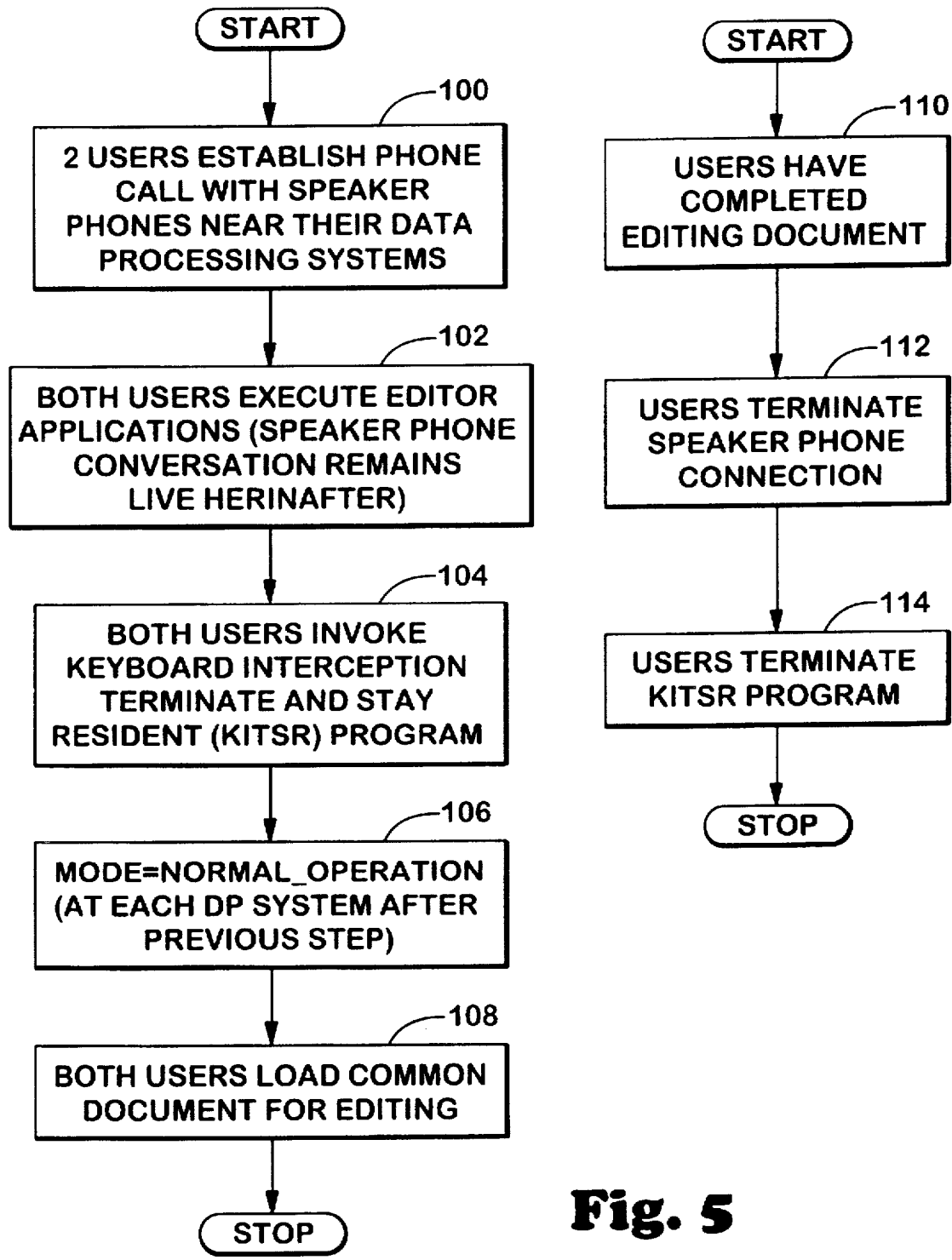
FIG. 5 shows a logic flow diagram for starting up the present invention and a logic flow diagram for terminating the process of the present invention.

FIG. 5 depicts the logic for invoking and terminating the present invention. The process begins with step 100 in which two users establish speaker phone communication, thus, using one of the two sessions from a double session embodiment or single session from the one-session embodiment. In step 102, each of the users executes respective editor applications, which may be the same or different applications. Step 104 establishes a keyboard interrupt, referred to as a keyboard interception terminate and stay resident (KITSR) program, described above as a stolen keyboard handler. In the double session embodiment, the KITSR program in turn establishes the remaining session from the double session architecture. Once this program is invoked by both users, the local variable MODE is initialized in normal operation, as shown in step 106. Invocation of the telephone editing of the present invention is completed in step 108, in which both users call up the document that they wish to edit.

It should be understood that, for proper control and cooperation, each user maintains its own local variables MODE and CU_MODE, to describe its own mode of operation and that of the connected user, respectively.

To terminate document editing by telephone, step 110 shows that the users have completed the editing procedure. Then, both users terminate the speaker phone communications in step 112 and terminate the keyboard interception terminate and stay resident program in step 114, thus simply backing out of the startup steps of FIG. 5.

While FIG. 5 has been described with regard to word processing editing of a document, the present invention is equally application to other applications, such as spread sheet programs, graphics programs, and the like, that have commonality in logical navigation and function.

Figure 6:
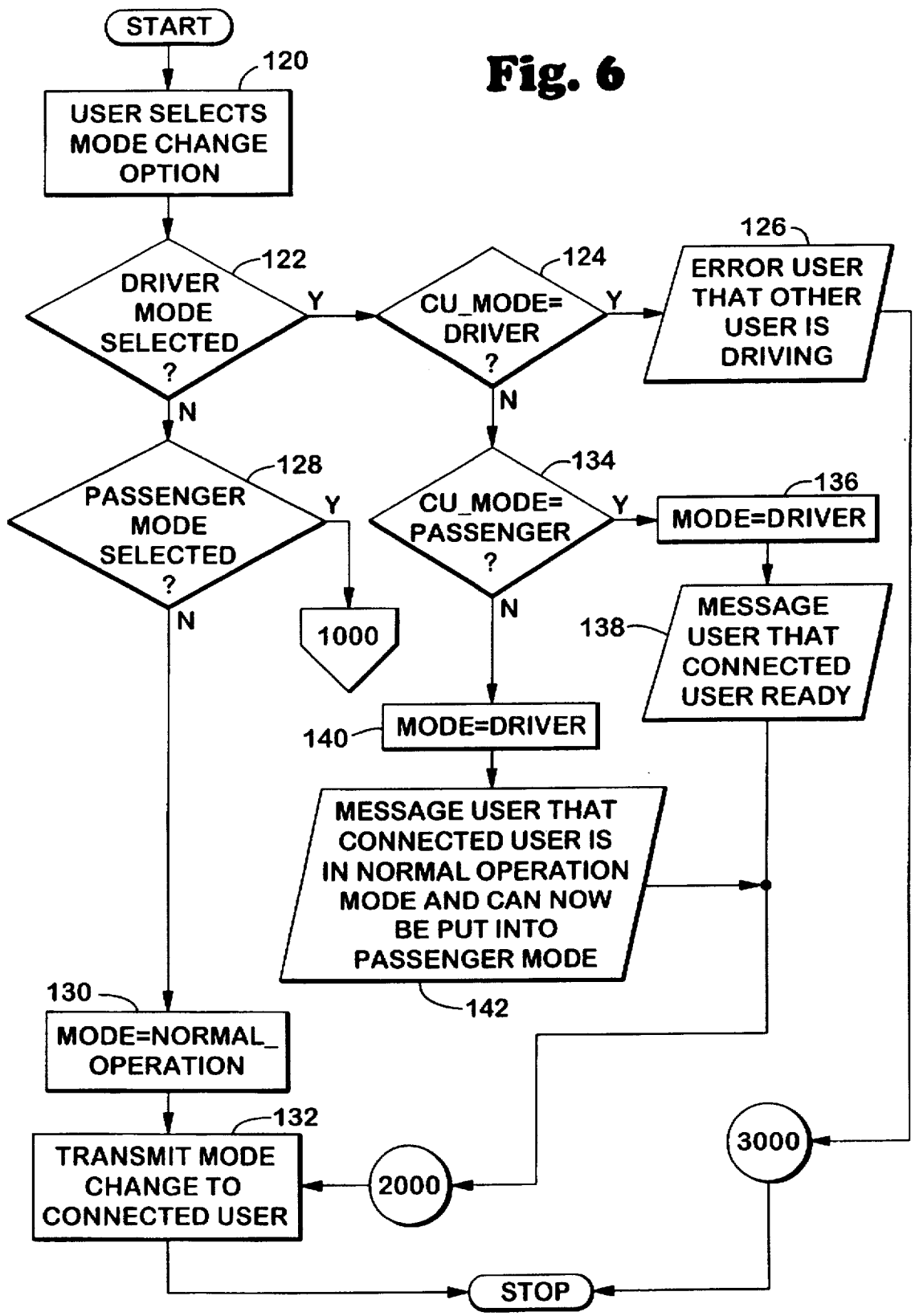
FIG. 6 depicts the initial portion of the logic flow diagram for establishing the proper mode of operation for a sender (Driver) and a receiver (Passenger).
Figure 7:
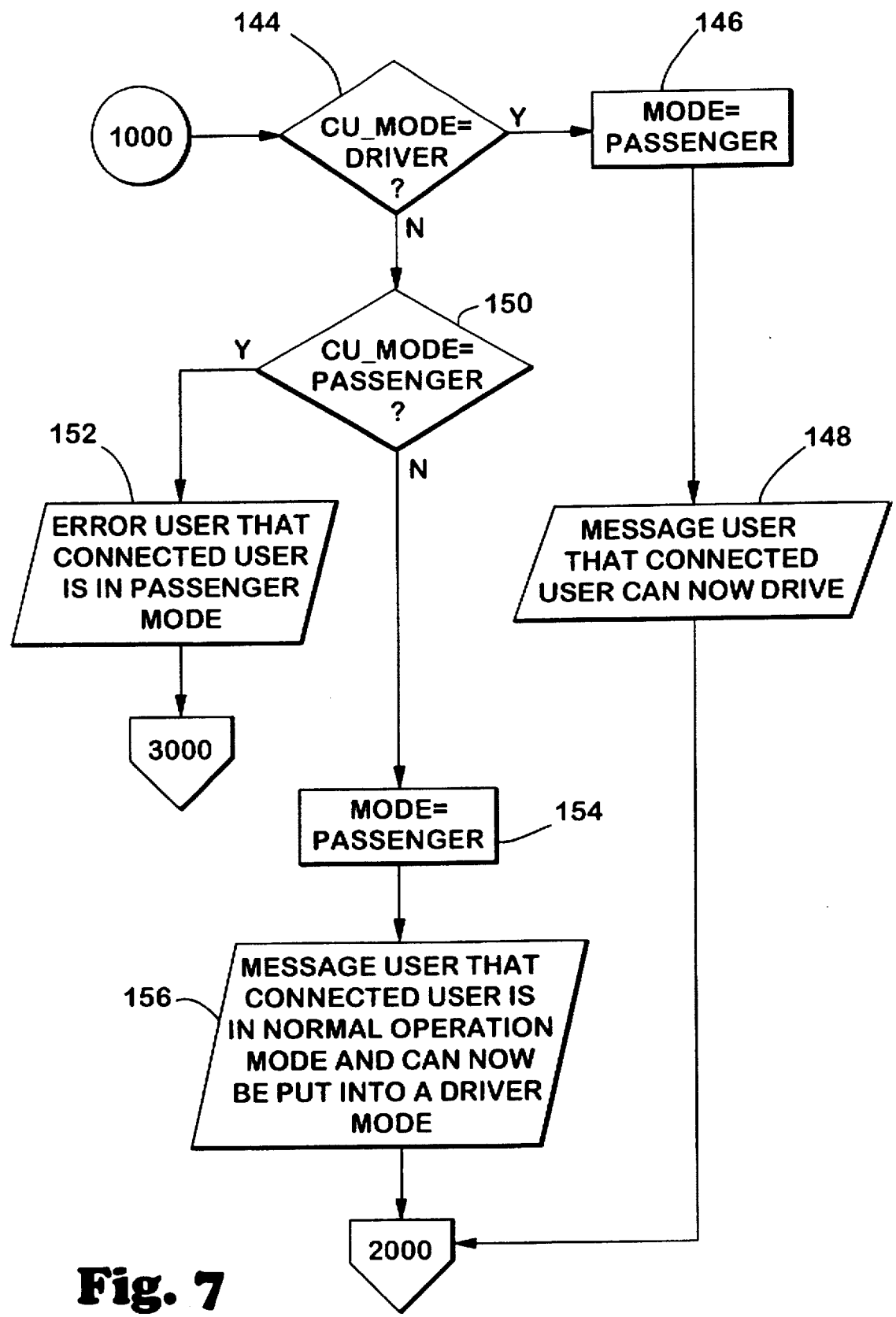
FIG. 7 depicts the remainder of the logic flow diagram begun in FIG. 6.

FIGS. 6 and 7 together depict the logic involved in establishing which of the users will be the driver and which will be the passenger in the editing operations that are to follow. The method of FIGS. 6 and 7 enhance performance by maintaining a local variable specifying the user's mode (MODE) as well as a local variable signifying his partner's mode (the connected user's mode or CU_MODE).

In step 120, one of the users uses a voice command, mouse click, keyboard command, or other appropriate input command to select the option to set or change the local MODE variable. The MODE variable defines three options, Driver, Passenger and normal operation (see step 106). The user in Driver mode dictates effective changes in his own data processing system and in the data processing system of the recipient in Passenger mode. Step 122 then determines if the user has selected the Driver mode. If so, the flow passes to step 124 and checks to see if the other party (the "connected user" or CU) is also in the Driver mode. If the connected user is also in Driver mode, step 126 issues an error message back to the first user that the connected user is in the Driver mode and the system stops. This is because both users cannot be in the Driver mode and thereby dictate editorial changes to the document of interest.

Returning to step 122, if the first user did not select the Driver mode, the logic passes to step 128 and determines if the first user selected Passenger mode. If the first user has selected Passenger mode, the logic exits at node 1000 to the logic flow of FIG. 7. If Passenger mode was not selected, the first user must have selected normal operation, and step 130 sets the variable MODE to normal operations. Step 132 then informs the connected user of this mode change to normal operation and the system stops. In the double-session embodiment, informing involves transmitting an appropriate data stream to the connected user. In the single-session embodiment, informing involves playing the appropriate DTMF sequence on the session for interpretation by the connected user's data processing system as described by this invention.

Returning to step 124, at this point the data processing system has already found that the first user has selected the Driver mode and step 124 determines if the connected user has also selected Driver mode. If not, step 13 4 checks to see if the first user's variable CU_MODE is set to PASSENGER. If so, then step 136 sets the first user's variable MODE to DRIVER and step 138 informs the first user that the connected user is ready. The process then passes to step 132 to inform the connected user of the mode change and stops.

Returning to step 134, if the variable CU_MODE is not set to PASSENGER, the step 140 sets the variable MODE to DRIVER and step 142 informs the user that the connected user is in normal operation mode and is available for Passenger mode. The process then passes to step 132 to inform the connected user of the mode change and stops.

In step 128, if the user has selected passenger, the process passes to the logic flow diagram of FIG. 7 at entry node 1000. Step 144 then determines if the variable CU_MODE is set to DRIVER. If so, step 146 sets the variable MODE to PASSENGER and step 148 informs the first user that the connected user can now drive. The process then returns to FIG. 6 at node 2000, and step 132 informs the connected user of the mode change and then the process stops.

Returning to step 144, if the local variable CU_MODE is not set to DRIVER, then step 150 checks to see if CU_MODE is set to PASSENGER. If so, then both users are set for Passenger mode, set step 152 provides an error message to the first user that the connected user is in passenger. The process returns to the logic flow of FIG. 6 through node 3000 and stops. If step 150 determines that CU_MODE is not set to PASSENGER, then step 154 sets MODE to PASSENGER. Step 156 then informs the user that the connected user is in normal operation mode and is available to be put in Driver mode. The process then exits at node 2000 in FIG. 6.

Figure 8:
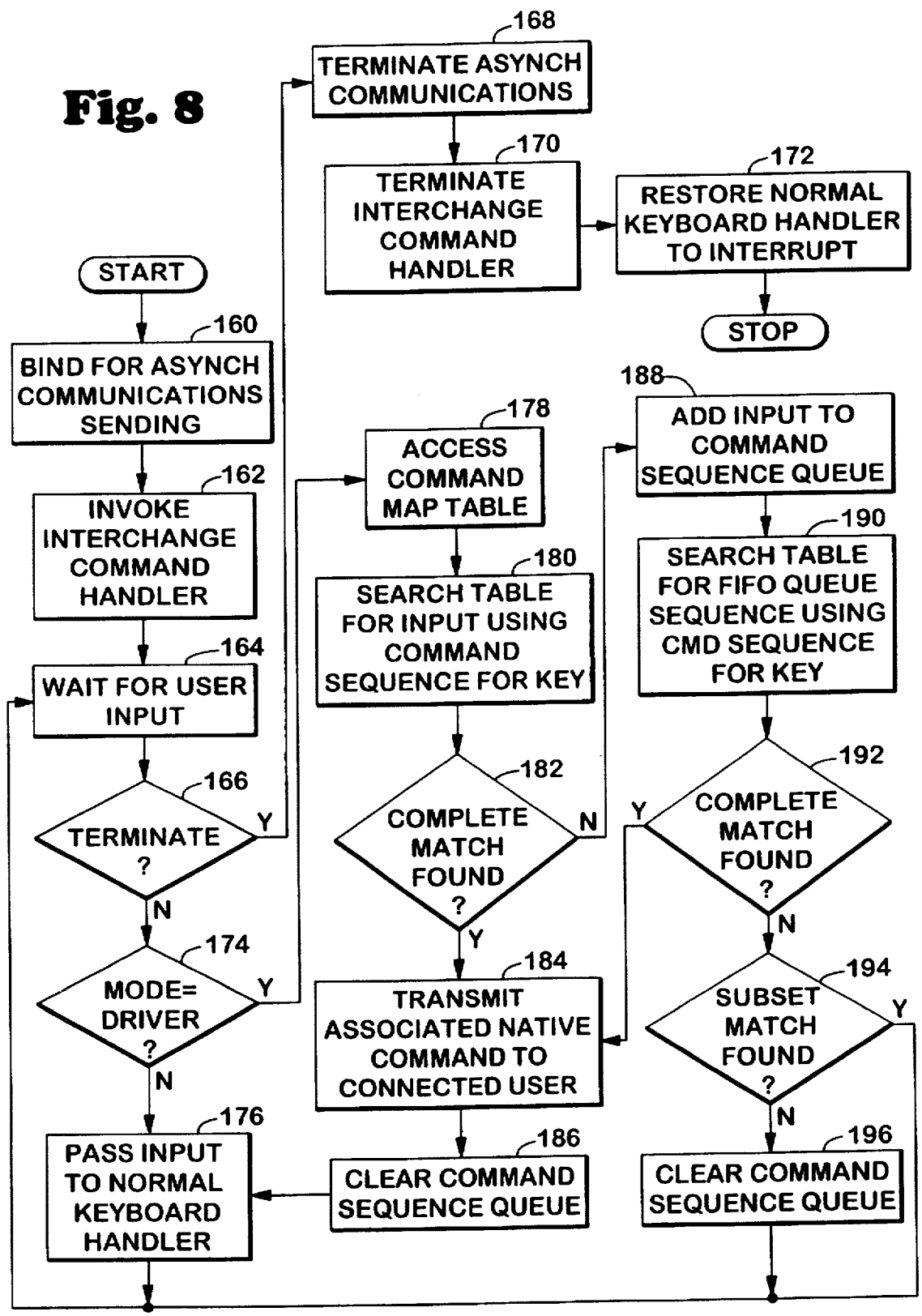
FIG. 8 depicts a logic flow diagram of carrying out the method of the present invention, from the point of view of the Driver.
Figure 9:
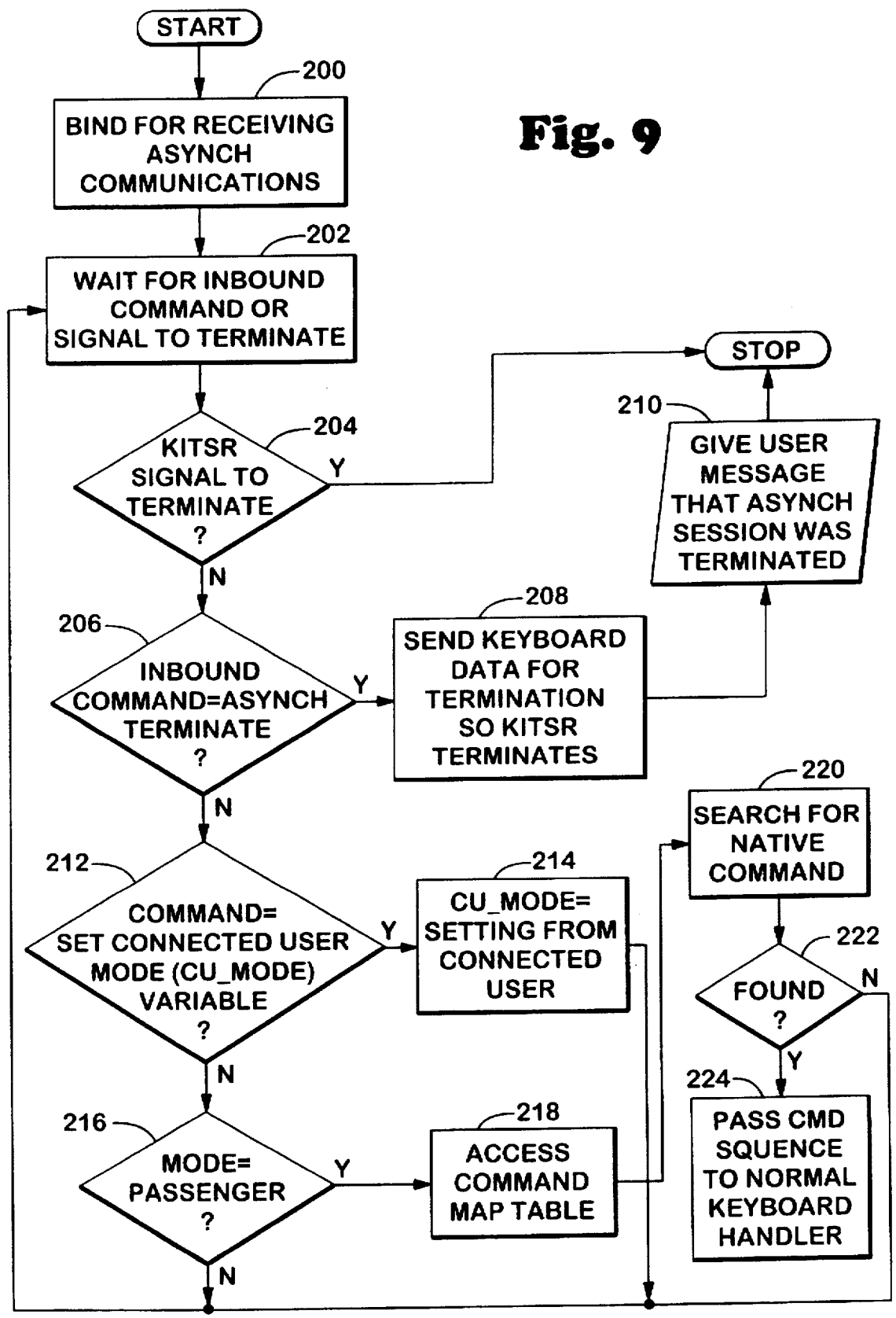
FIG. 9 depicts a logic flow diagram of carrying out the method of the present invention, from the point of view of the Passenger.

Now that the proper mode of operation has been set for the user and for the connected user, FIG. 8 continues the process of executing the editorial changes to the document of interest from the point of view of the Driver, even though FIG. 8 and FIG. 9 execute on all participating data processing systems. At the start of FIG. 8, the keyboard interrupt is stolen and replaced with FIG. 8 logic. Step 160 binds the user's system for asynchronous communications sending, i.e., sets up a valid session between the sender and connected user. In a single-session connected environment, the bind simply consists of ensuring a speaker-phone connection is live. In a double session environment, the second line must bind a communication session to the target system. Commands, rather than DTMF's, can be sent thereto or received therefrom. In this case, FIG. 8 step 160 will actually bind communications to FIG. 9, step 200. Then, step 16 2 invokes the interchange command handler, as described below with regard to FIG. 9. Step 164 then awaits user input. The terminate and stay resident keyboard interrupt, i. e., the keyboard interceptor program, steals the keyboard, so that keyboard inputs can come from any defined source, such as a voice command, a mouse, etc.

When a user input is detected, step 166 determines if the input was a terminate signal. If so, step 168 terminates the communications link, step 170 terminates the interchange command handler, step 172 restores normal keyboard handler function, and the process stops. Returning to step 166, if the detected signal was not a terminate signal, then step 174 checks to see if the user is in the Driver mode. If it is not, the input is passed along in step 176 to the normal keyboard handler for execution, and the process returns to step 164 to await a user input.

Returning to step 174, if the user is Driver mode, then step 178 accesses the command map table 50 of FIG. 3. Step 180 then searches the table for input using the command sequence 54. If a complete match is found in step 182, then the associated native command 52 is transmitted in step 184 to the connected user. In the double-session embodiment, informing involves transmitting an appropriate data stream to the connected user. In the single-session embodiment, informing involves playing the appropriate DTMF sequence on the session for interpretation by the connected user's data processing system as described by this invention. Step 186 then clears the command sequence queue and the process continues with step 176 in which the input is passed to the normal keyboard handler.

Returning to step 182, if the input was not found in the command map table 50, then the input is placed on the command sequence queue in step 188. Then, step 190 searches the table for a FIFO queue sequence using the command sequence 54 for a key. Step 192 checks to see if a complete match has now been found, and, it so, passes to step 184, transmitting the associated native command to the connected user. If a complete match is not found in step 192, step 194 checks for a partial match. If a partial match is found in step 194, the command is left on the command sequence queue, and the process returns to step 164 to await user input. If no partial match is found in step 194, the command sequence queue is cleared in step 196 and the process again returns to step 164. It should be noted that the command sequence queue allows building composite keystrokes which can be compared to the command map table for a match. A partial match allows building composite keystrokes which are candidates to eventually match a command map table entry. This allows complex macros or function key sequences to be configured in the command map table. Step 194 validates that the currently built command sequence is a subset of one or more command map table entries.

FIG. 9 depicts the process of the present invention from the point of view of the connected user, even though FIG. 8 and FIG. 9 execute on all participating data processing systems. The process begins by binding for receiving asynchronous communications in step 200. In a single-session connected environment, the bind simply consists of ensuring a speaker-phone connection is live. In a double session environment, the second line must bind a communication session to the target system. Commands, rather than DTMF's, can be sent thereto or received therefrom. In this case, FIG. 9 step 200 will actually bind communications to FIG. 8, step 160. Step 202 awaits an inbound command from the user, or a signal to terminate. Step 204 checks for a KITSR signal to terminate and, if so, the process simply stops. If step 204 does not detect a KITSR signal to terminate, step 206 monitors for an inbound command from the user to terminate. If step 206 detects such a terminate command, then step 208 sends keyboard data for termination so that the KITSR terminates. Step 210 then provides a message to the user than the asynchronous communications session has been terminated, and the process stops.

If step 206 did not detect a command to terminate the asynchronous session, then step 212 monitors the input command to determine is the command was an order to set the recipient's variable CU_MODE. If step 212 detects such a command, then step 214 sets the variable CU_MODE to that dictated by the received command and the process returns to step 202 to await another inbound command or signal to terminate. If step 212 did not detect a command to set the CU_MODE variable, then the recipient checks its own mode in step 216 to verify that it is in Passenger mode. If it is not in Passenger mode, the process returns to step 202 to await another inbound command or signal to terminate. If the recipient is in Passenger mode, the step 218 accesses the command map table and step 220 searches for a native command 52. If a native command is found, then decision point 222 moves the process to step 224 in which the command sequence is passed through to the normal keyboard handler. If a native command is not found in step 220, the step 222 returns the process to step 202 to await a further command. Steps 202, 206, and 212 work with the interpretation of step 202. In a single-session embodiment, step 202 listens for DTMF signal patterns which denote a specific command. In a double-session embodiment, step 202 receives an appropriate data stream from the connected user's data processing system which denotes a specific command.

Now that the method and system of the present invention have been completely described, the following discussion provides a brief example of the operation of the present invention in navigating within a target document and providing changes to the document.

Assume that each of a Driver and a Passenger has installed their respective command map tables, and each is using a different application program, such as a word processing program. Also assume that the Driver has identified a character string in the target document that he wants to search for. The Driver may now initiate a search by calling up a Start Search command, such as F2 in System Type X in FIG. 2. This may also be invoked through a voice command, or any other appropriate means. The Driver's system matches the command in the command map table and retrieves the associated native command that is the Start Search command.

This native Start Search command is communicated across the session to the Passenger's system. The Passenger's system accesses its own command map table for a native command match and retrieves the associated application Start Search command, such as Ctrl-F2 from System Type Y in FIG. 2. The Driver then issues a character string, such as by typing the string on a keyboard, or dictating the string orally, or other means. These characters are issued as keystrokes to the Driver's system and are driven to the Passenger's system as keystrokes in the same manner just described. The keystrokes are then issued to the Passenger's data processing system as that series of keystrokes. The Driver then issues the command for End Search, such as F2 in FIG. 2, and this will also be similarly processed and carried to the Passenger and entered at the Passenger's system as an ENTER, thus completing the search.

Note also that, in order to eliminate certain ambiguities, one may wish to issue certain commands with function keys, while issuing character strings as voice commands.

In order to edit a portion of the document, once the specific location within the document has been located, such as by a search, the same scheme is followed. For example, if the Driver has identified a term (e.g., "insure") that he wishes to change (e.g., to "ensure"), he may invoke a Replace command. The associated native command which is retrieved from the Driver's command map table is carried to the Passenger's system to access the Passenger's command map table and is issued to the Passenger's system as the appropriate keystrokes for Replace. Then, the keystrokes appropriate to replace "insure" with "ensure" are entered by the Driver and echoed on the Passenger's system in the same manner.

Those of skill in the art will recognize that one application, such as a word processing program, will provide options and capabilities that are not included in another such application. However, these differences in capabilities are easily accommodated by defining native commands and command sequences in the command map table of each of the Driver and Passenger.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A method in a data processing system for providing coordinated maintenance of data between an application in the data processing system and a partner data processing system, the method comprising the steps of:

establishing communications between the data processing system and the partner data processing system, executing a keyboard interrupt program in said data processing system, executing an interchange command handler program in said data processing system, setting a mode in said data processing system, and coordinating commands between the data processing system and the partner data processing system according to the mode in accordance with a command map table to affect data in the application in the partner data processing system from the data processing system.

2. The method of claim 1 wherein establishing communications involves establishing a plurality of sessions.

3. The method of claim 1 wherein the step of executing a keyboard interrupt program further comprises the steps of:

receiving input destined for a standard keyboard handler function from the data processing system to the partner data processing system, determining the mode of the data processing system, searching the command map table for the input destined for a standard keyboard handler function in accordance with the mode, the command map table including a command sequence field, sending commands to the partner data processing system in accordance with the mode, and sending the input destined for a standard keyboard handler function to the standard keyboard handler function in the partner data processing system.

4. The method of claim 3 wherein the step of sending commands to the partner data processing system further comprises the steps of:

retrieving a native command associated with a match of the input to the command map table, and transmitting the native command to the partner data processing system.

5. The method of claim 3 wherein the step of sending commands to the partner data processing system further comprises the step of building a FIFO queue of pending keystrokes which form a complex command when no match is found in the command map table.

6. The method of claim 3 wherein the step of searching a command map table is performed by comparing a single input to each command sequence field in the command map table.

7. The method of claim 3 wherein the step of searching a command map table is performed by comparing a single input to every subset of each command sequence field in the command map table.

8. The method of claim 3 wherein the step of searching a command map table is performed by comparing a FIFO queue of entered input built over time to every subset of each command sequence field in the command map table.

9. The method of claim 1 wherein the step of executing an interchange command handler program further comprises the steps of:

receiving a command from the partner data processing system, determining the mode of the data processing system, searching a command map table for a native command in accordance with the mode, and sending keyboard input to a standard keyboard handler function in accordance with the mode.

10. The method of claim 9 wherein the step of searching a command map table is performed by comparing the native command with each native command field in the command map table.

11. The method of claim 9 wherein the step of receiving a command involves receiving a native command.

12. The method of claim 9 wherein the step of receiving a command involves receiving a mode change command.

13. The method of claim 1 wherein the mode is a driver mode.

14. The method of claim 1 wherein the mode is a passenger mode.

15. The method of claim 1 wherein the mode is a normal operation mode.

16. The method of claim 13 wherein the driver mode is a pending string search.

17. The method of claim 13 wherein the driver mode is a pending string edit.

18. The method of claim 13 further comprising the step of receiving a keyboard input from the data processing system in the partner data processing system, wherein the keyboard input to a standard keyboard handler function in accordance with the mode is sending an associated command sequence from a command map table after a match is found.

19. A data processing system for providing coordinated maintenance of data between an application in the data processing system and a partner data processing system, the system comprising:

means for establishing communications between the data processing system and a partner data processing system, means for executing a keyboard interrupt program in said data processing system, means for executing an interchange command handler program in said data processing system, means for setting a mode in said data processing system, and means for coordinating commands between the data processing system and the partner data processing system according to the mode in accordance with a command map table to affect data in the application in the partner data processing system from the data processing system.

20. The system of claim 19 wherein the means for establishing communications comprises a means for establishing a multiplicity of sessions.

21. The system of claim 19 wherein the means for executing a keyboard interrupt program comprises:

means for receiving input destined for a standard keyboard handler function, means for determining the mode of the data processing system, means for searching the command map table for the input destined for a standard keyboard handler function in accordance with the mode, means for sending commands to the partner data processing system in accordance with the mode, and means for sending the input destined for a standard keyboard handler function to the standard keyboard handler function.

22. The system of claim 21 wherein the means for sending commands to the partner data processing system comprises:

means for retrieving a native command associated with a match of the input to the command map table, and means for transmitting the native command to the partner data processing system.

23. The system of claim 21 wherein the means for sending commands to the partner data processing system comprises means for building a FIFO queue of pending keystrokes which form a complex command when no match is found in the command map table.

24. The system of claim 21 wherein the means for searching a command map table comprises means for comparing a single input to each command sequence field in the command map table.

25. The system of claim 21 wherein the means for searching a command map table comprises means for comparing a single input to every subset of each command sequence field in the command map table.

26. The system of claim 21 wherein the means for searching a command map table comprises means for comparing a FIFO queue of entered input built over time to every subset of each command sequence field in the command map table.

27. The system of claim 19 wherein the means for executing an interchange command handler program comprises:

means for receiving a command from the partner data processing system, means for determining the mode of the data processing system, means for searching a command map table for a native command in accordance with the mode, and means for sending keyboard input to a standard keyboard handler function in accordance with the mode.

28. The system of claim 27 wherein the means for searching a command map table comprises means for comparing the native command with each native command field in the command map table.

29. The system of claim 27 wherein the means for receiving a command comprises means for receiving a native command.

30. The system of claim 27 wherein the means for receiving a command comprises means for receiving a mode change command.

31. The system of claim 19 wherein the mode is a driver mode.

32. The system of claim 19 wherein the mode is a passenger mode.

33. The system of claim 19 wherein the mode is a normal operation mode.

34. The system of claim 31 wherein the driver mode is a string search.

35. The system of claim 31 wherein the driver mode is a string edit.

36. The system of claim 31 wherein the keyboard input to a standard keyboard handler function in accordance with the mode is sending associated command sequence from command map table after a match is found.

* * * * *